United States Patent [19]

Estes, III et al.

[11] 4,119,896

[45] Oct. 10, 1978

[54] SEQUENCING CONTROL CIRCUIT

[75] Inventors: Bay E. Estes, III, Murrysville; Richard A. Nedbal, Pittsburgh, both of Pa.

[73] Assignee: The Alliance Manufacturing Company, Inc., Alliance, Ohio

[21] Appl. No.: 690,984

[22] Filed: May 28, 1976

[51] Int. Cl.[2] .............. H02P 1/26

[52] U.S. Cl. .............. 318/266; 318/447

[58] Field of Search .............. 318/265, 266, 443, 444, 318/446, 447, 466, 468, 474-476, 484, 387, 388, 393

[56] References Cited

U.S. PATENT DOCUMENTS

| | | | |
|---|---|---|---|
| 3,178,627 | 4/1965 | Houk | 318/468 X |
| 3,199,857 | 10/1965 | Klamp | 318/266 |
| 3,665,277 | 5/1972 | Velazquez | 318/447 |
| 3,764,875 | 10/1973 | Harris | 318/266 |

*Primary Examiner*—Robert K. Schaefer
*Assistant Examiner*—W. E. Duncanson, Jr.
*Attorney, Agent, or Firm*—Woodling, Krost, Granger & Rust

[57] ABSTRACT

A sequencing control circuit is provided for a door operator motor which is connected to open and close a garage door as controlled by signals from manual switches and load switches. The sequencing control circuit includes time delay means with a first time delay period in the order of six to eight seconds. This permits a person to hold a push button switch closed for about six to eight seconds so that a slab door may be opened against a snow drift which otherwise would have so much torque requirement on the motor that an overload switch would stop the motor. Enabling means is provided to enable the motor during this time period yet to disable the constant signal from the push button for periods longer than this time delay period so that the door operator motor then is responsive to signals from the load switches.

The sequencing control circuit also includes a latch circuit having an output in a feed back loop to maintain the latch circuit latched upon a momentary input control signal. This allows time for the motor to accelerate the load to a normal running condition and to open any closed limit switch or closed torque switch during this acceleration period.

13 Claims, 5 Drawing Figures

DIS
LP
R1
VSS
VDD
OPT
UP
DN
R2
TRIG.
SCHM. TRIG.
CL
PB
TQ
LIM

SEQUENCING CONTROL CIRCUIT

BACKGROUND OF THE INVENTION

The prior art sequencing control circuits have included a number of different stepping relays which were electromagnetic relays capable of achieving a sequence of four different conditions of a motor and load. The load of the motor has included a garage door operator motor and the four conditions establish run up, stop up, run down and stop down of the raising and lowering type of garage door. The prior art electromagnetic relays were able to achieve these four functions and count control a reversing motor as well as controlling a lamp to illuminate the interior of the garage. The prior art had manual switches as inputs to the electromagnetic relays including a manual push button switch and a remotely controlled radio receiver switch. The transmitter controlling the receiver switch was often a hand-sized transmitter which would be located in the vehicle to be garaged. Such prior art garage door operators also had load switches such as up and down limit switches and torque or overload switches.

The prior art electromagnetic relays could also provide for a sequence of operation wherein if the garage door upon descending should strike a child or a pet animal, for example, the door would not merely stop due to overload, rather it also would move back toward an open position. This was a safety reverse feature during door closing. The prior art door operator circuits could also provide a time delay so that the lamp illuminating the garage could remain on for a period of one or two minutes even after the door had closed and the motor had been deenergized. Such prior art sequencing control circuits of the electromagnetic stepping relay type may be of the type illustrated in U.S. Pat. No. 3,719,005 issued Mar. 6, 1973.

The prior art door operator controls also included the type often used on commercial garage doors wherein a person had to maintain his finger on an "up" button or "down" button in order to have the door continue to move in the desired direction. If one ceased depressing the button the door would stop in a partially opened or closed condition. People familiar with this type of commercial garage door operator would often tend to hold their finger on the push button switch of a residential garage door operator for the entire time that the door was moving. In so doing this kept the actuating coil of the stepping relay energized, hence the ratchet mechanism was not released and the stepping relay was then incapable of responding to a load switch input, e.g. limit switch or torque switch. The same type of dangerous operating condition could occur if there was a short circuit in the push button wiring which would give a continuous input signal to the electromagnetic relay. This means that the door operator motor would not shut off when reaching the limit switch. An even more dangerous condition was that if the door were moving downwardly and a child got trapped under the door, the door would not reverse to move upwardly. If the radio transmitter in the automobile were left on the seat and a package placed on top of it this might depress the push button switch so that the transmitter emitted a continuous signal. This could cause the same type of dangerous condition. Also if a person entered the garage and accidentally knocked a rake or other tool to lean against the push button switch causing a continuous signal, this could also cause the same dangerous condition.

The door operator motor and garage door as a load connected thereto have inertia and in a typical garage door it takes about 0.3 to 0.6 of a second for the motor to accelerate the load to a condition of normal running speed in the motor. The torque switch is usually closed when the motor is at rest and the motor must accelerate to about half speed before this torque switch opens. Also the travel limit switches are often closed at the limit condition of the door and the door must move to release the closed condition of such limit switch. Thus there is a period of about 0.3 to 0.6 of a second wherein an input signal is provided by the torque switch or the limit switch. If a person merely depressed the push button switch for a fraction of a second which was less than the time period of 0.3 to 0.6 of a second, then the door operator circuit could obtain an additional input signal from the then closed limit or torque switch. This additional input signal would again actuate the electromagnetic stepping relay to the next condition which would be a door stopped condition. The person would then have to depress the push button three more times to get the door moving in the desired upward direction.

If the power were to be interrupted while the door was moving upwardly, for example, the door naturally would stop. When the power was restored and the push button again depressed, the door would not move in an upwardly direction instead it would move downwardly toward a closed condition. Accordingly, with the prior art electromagnetic relays, it would take two more depressions of the push button to get the door moving in the desired upward direction.

SUMMARY OF THE INVENTION

The invention may be incorporated in a sequencing control circuit for a door operator motor operable to open and close a garage door as controlled by signals from manual switch means and load switch means, said sequencing control circuit comprising, in combination, input means connecting said switch means to control energization of the motor, time delay means having a first time delay period and enabling means connecting said time delay means to said motor energization control means so that said time delay means enables control of the motor by a signal from said load switch means.

An object of the invention is to provide a sequencing control circuit which obviates the above-mentioned disadvantages of the prior art circuits.

Another object of the invention is to provide a sequencing control circuit for a door operator wherein enabling means is provided to enable control of the motor by a signal from load switches.

Another object of the invention is a sequencing control circuit which includes enabling means connected to disable control of the motor by a constant signal from a manual switch.

Another object of the invention is to provide a sequencing control circuit with a latch so that the control circuit is latched upon a momentary input control signal.

Another object of the invention is to provide a sequencing control circuit which always powers up a door operator control in the door closed motor stopped condition.

Other objects and a fuller understanding of the invention may be had by referring to the following description and claims, taken in conjunction with the accompanying drawing.

DESCRIPTION OF THE PREFERRED EMBODIMENT

Figure 1:
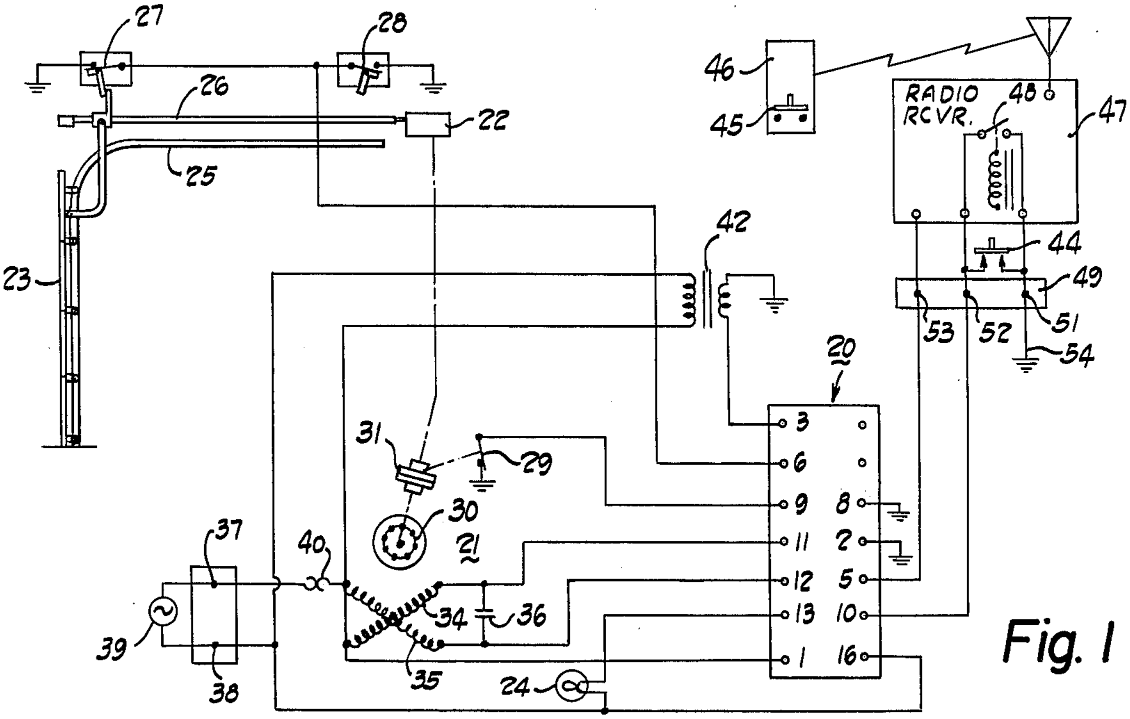
FIG. 1 is a schematic diagram of a sequencing control circuit for a door operator motor incorporating the invention.

FIG. 1 schematically illustrates a sequencing control circuit 20 for a motor 21 connected in a door operator 22 which in turn is connected to open and close a door 23. The door may be used for various purposes, for example to close access to a garage and the door operator may have a lamp 24 to illuminate the interior of the garage. The door 23 is shown as movable on a track 25 by means of a drive mechanism, not shown, but within the door operator 22 and this drive mechanism may move a carriage along a channel 26 to actuate a down limit switch 27 and an up limit switch 28.

The motor 21 includes a rotor 30 connected through a friction clutch 31 to the door operator 22. A torque or overload switch 29 is connected on the load side of the clutch 31 to be responsive to selective load conditions on the door 30. The motor 21 also includes stator windings 34 and 35 and a reversing capacitor 36. Energization terminals 37 and 38 are connected for energization from A.C. source 39 and energize the stator windings through a thermal overload device 40. A step down transformer 42 is connected for energization from the terminals 37 and 38 in order to provide a safe low voltage, e.g., in the order of 30 volts to the sequencing control circuit 20.

Input switch means are provided for the control circuit 20 and include a manual push button switch 44 and a transmitter push button switch 45. The switch 45 is provided in a radio transmitter 46 which when the switch 45 is actuated emits a radio signal. A radio receiver 47 is provided and if both radio receiver and transmitter are on the same code and frequency then a switch 48 in the receiver 47 will be closed. A terminal strip 49 includes terminals 51, 52 and 53. Terminal 53 is connected to the receiver 47 to supply an operating voltage thereto relative to terminal 51 which is the external ground 54.

The sequencing control circuit 20 is a multi-terminal device and in one embodiment manufactured in accordance with this invention was a printed circuit board with terminals thereon. This was a 16 terminal device but not all terminals required external connections. The terminals with external connections thereto are Nos. 1, 2, 3, 5, 6, 8, 9, 11, 12, 13 and 16.

Figure 2:
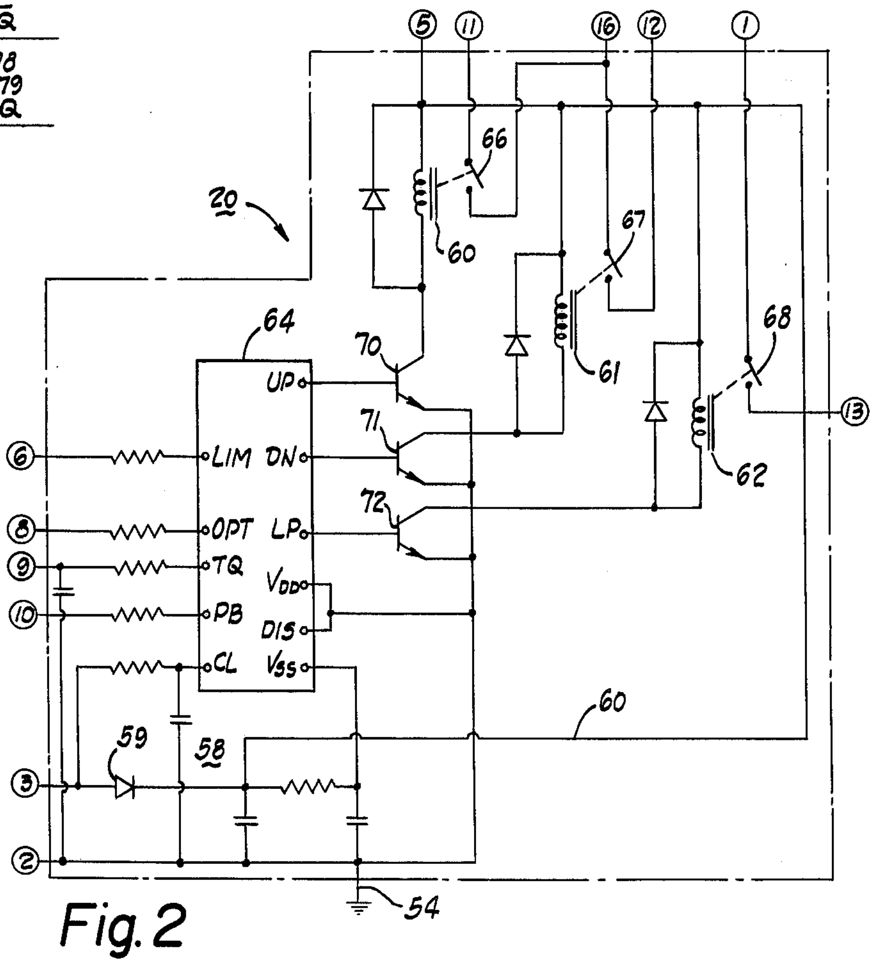
FIG. 2 is a schematic diagram of the sequencer used in FIG. 1.

FIG. 2 schematically illustrates the internal circuitry of the sequencing control circuit 20 with the same reference numerals on the terminals shown around the periphery of the circuit. This sequencing control circuit 20 includes a power supply 58 which includes a rectifier 59 supplying filtered D.C. on conductor 60 to output relays 60, 61 and 62 and to terminal 5 which supplies power to the radio receiver 47 via terminal 53. The power supply 58 also supplies filtered D.C. power to terminal $V_{ss}$ on a sequencer 64. The sequencer 64, described below, includes a number of gates, transistors and flip-flops and may be an integrated circuit. The power supply 58 has the same external ground 54 as is shown in FIG. 1. Thus circuits FIGS. 1 and 2 are negative ground systems whereas the sequencer 64 as described below is a positive ground circuit.

The relays 60–62 control contacts 66–68, respectively. When relay 60 is energized, contact 66 is closed to complete the circuit between terminals 11 and 16. As shown in FIG. 1 this will energize stator winding 34 directly and stator winding 36 indirectly through capacitor 36 for motor rotation in the direction illustrated as the up direction for door 23. Energization of relay 61 closes contact 67 for a connection between terminals 12 and 16 which will provide a down direction of rotation of the motor 21. Energization of relay 62 closes contact 68 for a connection between terminals 1 and 13 to illuminate the lamp 24.

Each of the relays 60–62 is provided with a driver transistor 70–72, respectively. The emitters of transistors 70–72 are connected to the external ground 54 with the collectors connected to the respective output relays 60–62, respectively. The bases of these transistors are connected to sequencer terminals respectively designated as UP, DN, and LP. When a base of a transistor is at the same potential as the emitter then such transistor is turned off. When the base is positive relative to the emitter, the transistor is turned on to energize its respective relay and thus establish the respective function of motor energization up or down or lamp energized.

The sequencer 64 has additional terminals including a limit terminal LIM, a lamp option input terminal OPT, an overload torque input TQ, a push button input PB, and a clock input CL. Each of these terminals is connected through a current limit resistor to sequencing control circuit terminals 6, 8, 9, 10 and 3, respectively. The sequencer 64 also includes a terminal $V_{DD}$ to supply operating voltages to some drains of FET transistors in the sequencer 64. A lamp delay disable terminal DIS is also provided in the sequencer 64 and these terminals $V_{DD}$ and DIS are connected to the external ground 54.

Figure 4:
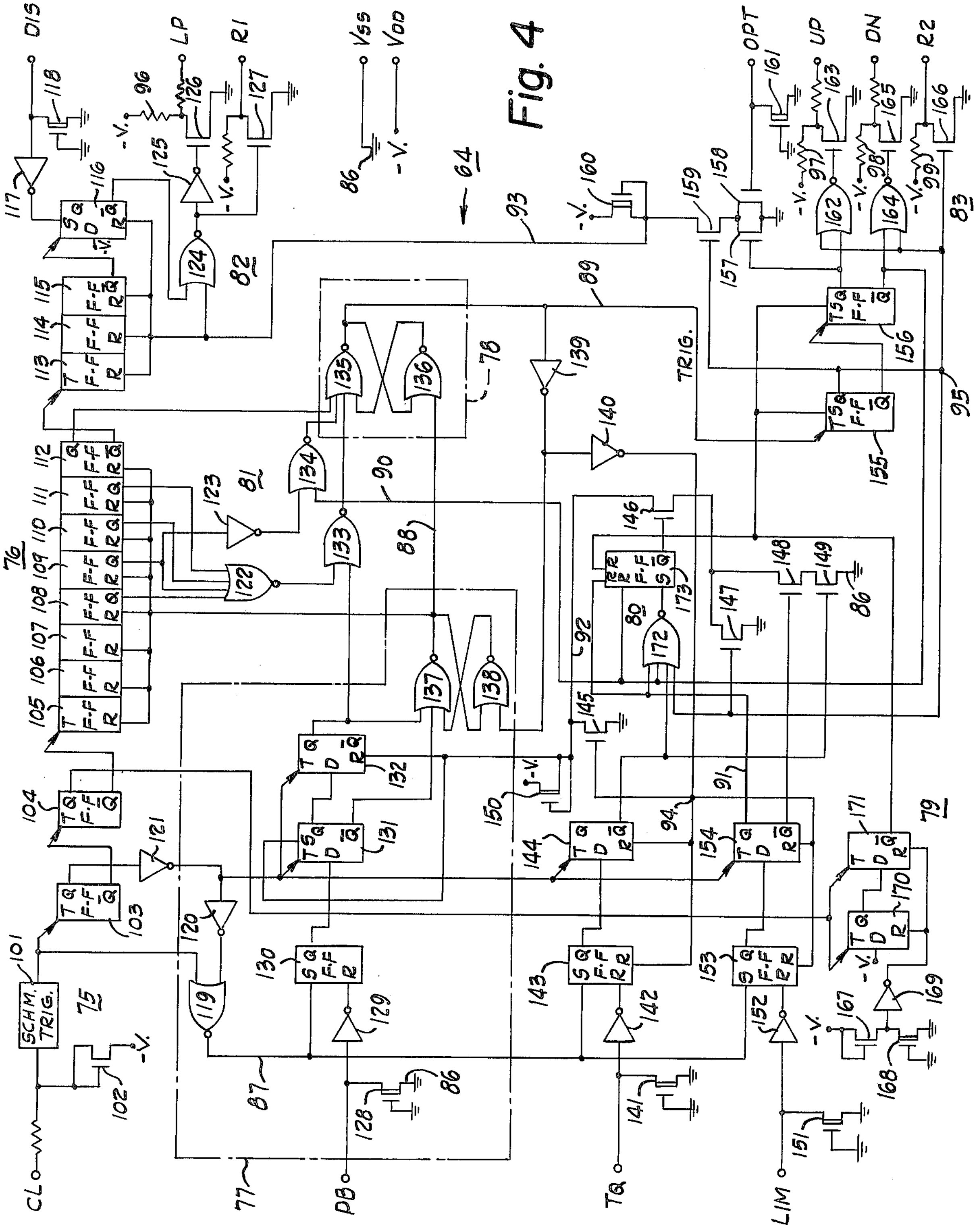
FIG. 4 is a schematic diagram of the integrated circuit used in the sequencer.

FIG. 4 is a schematic diagram of a sequencer 64 which may be used in the circuit of FIG. 2. This integrated circuit logic may take different forms and as shown in FIG. 4 the preferred embodiment includes many NOR gates, FET transistors of the PMOS type and various flip-flops. Two different types of FET transistors are shown, the enhancement-mode type illustrated with a single bar and the depletion-mode type with a double bar.

Input signals are provided at various terminals on the left side of FIG. 4, including terminals CL, PB, TQ and LIM. Output terminals are shown at the right side of FIG. 4 and include UP, DN, and LP to control the up and down condition of the motor 21 and the lamp 24.

Generally, the sequencer 64 includes a clock circuit 75, a divider or counter circuit 76, a GO circuit 77, a trigger circuit 78, a power-up circuit 79, a safety reversal circuit 80, an enable circuit 81, a lamp delay circuit 82 and an output circuit 83.

The clock circuit 75 obtains a timing frequency from some source and in this preferred embodiment the timing source is obtained from the clock terminal CL which is the commercially available power frequency. In the United States this is generally 60 Hertz. This incoming clock frequency is connected to a Schmitt trigger 101. An enhancement mode FET transistor 102 is connected at the input of the Schmitt trigger 101 to the negative operating voltage −V. As shown at the righthand side of FIG. 4, this negative operating voltage is the $V_{DD}$ for the drain voltage. $V_{ss}$ is the source voltage of some FET transistors connected to internal ground 86. This is different from the external ground 54 because the circuits of FIGS. 1 and 2 are negative ground circuits and the circuit of FIG. 4 is shown as a positive ground circuit so that negative logic applies in FIG. 4.

The Schmitt trigger 101 supplies a signal to the toggle input of a T flip-flop 103. This flip-flop is one of a sequence of flip-flops 103–116 in the divider circuit 76.

The GO circuit 77 includes an inverter 121 and another inverter 120 connected in series from the Q output of flip-flop 103 to one of two inputs of a NOR gate 119. Another input of this gate 119 is supplied from the output of the Schmitt trigger 101. The output of the NOR gate 119 is supplied on a conductor 87 to the set input S of an RS flip-flop 130, and the Q output thereof is connected to the data input of D of a type flip-flop 131. The Q output of this flip-flop is connected to the D input of a D type flip-flop 132. The push button input PB is connected through an inverter 129 to the reset input R of flip-flop 130. Also this push button input is biased to the internal ground 86 through a depletion-mode FET transistor 128. The gate of this transistor is also connected to internal ground. The GO circuit 77 further includes three input NOR gates 137 and 138 which together form a set-reset flip-flop. The GO signal appears on a GO signal conductor 88 which is connected to the reset terminals R of the flip-flops 105–112 and is also connected to an input of a NOR gate 136 connected in latch configuration to a four input NOR gate 135. The output from the NOR gate 135 is a trigger signal TRIG appearing on a trigger conductor 89, which supplies a trigger signal to the output circuit 83.

The enable circuit 81 includes a four input NOR gate 122 having inputs from the Q outputs of each of the flip-flops 108–111. The output from NOR gate 122 is supplied to one input of a NOR gate 133 and the other input is supplied from the Q output of flip-flop 132. The output of NOR gate 133 is supplied to one of four inputs of the NOR gate 135. Another input comes from the Q output of flip-flop 112. Still another input comes from the output of a NOR gate 134. An inverter 123 has an input from the Q output of flip-flop 109 and the output of inverter 123 is applied to one input of the NOR gate 134. Another input of NOR gate 134 comes from a conductor 90 from the output circuit 83.

The torque input TQ is an incoming signal coming from the torque switch 29 and is biased to ground through a depletion-mode FET transistor 141 in a manner similar to the push button input PB. The TQ signal is also applied through an inverter 142 to a reset input R of an RS flip-flop 143. The Q output of flip-flop 143 is applied to the data input D of a D type flip-flop 144. The $\overline{Q}$ output of flip-flop 144 is connected to one of four inputs of a NOR gate 172 in the reversal circuit 80.

The limit switch input LIM receives an input signal from the limit switches 27 or 28 and is biased to ground by a depletion-mode FET transistor 151 in a manner similar to the push button input PB. This limit switch input LIM is connected through an inverter 152 to a reset input R of an RS flip-flop 153. The Q output of this flip-flop is connected to the data input of a D type flip-flop 154. The Q output of this flip-flop is connected to a conductor 91 leading to the reversal circuit 80. The $\overline{Q}$ of flip-flop 154 is also connected to the reversal circuit 80.

The reversal circuit 80 includes the NOR gate 172 which has an output connected to the set input S of an RS flip-flop 173. This reversal circuit also includes enhancement mode FET transistors 145–149. The $\overline{Q}$ output of flip-flop 173 is connected to the gate of transistor 146. This transistor is connected to the internal ground 86 by the series connected transistors 148 and 149. The other end of transistor 146 is connected to a conductor 92. The transistor 145 is connected between this conductor 92 and the internal ground and a depletion-mode FET transistor 150 is connected between this conductor 92 and the operating voltage source −V. The transistor 147 is connected in parallel with the series transistors 148 and 149.

The power-up circuit 79 includes an enhancement-mode FET transistor 167 connected in series with a depletion-mode FET transistor 168 between −V and internal ground. At the junction between these two transistors the input of an inverter 169 is connected, the output of which is connected to reset terminals R of D flip-flops 170 and 171. The Q output of flip-flop 170 is connected to the data input D of flip-flop 171 and the $\overline{Q}$ output of this flip-flop is connected to the set inputs of flip-flops 155 and 156.

The trigger signal conductor 89 is connected through an inverter 139 to one of the inputs of the NOR gate 138. The conductor 89 is also connected through an inverters 139 and 140 to a conductor 94 which is connected to the reset terminals R of the flip-flops 143, 144, 153 and 154.

The output circuit 83 includes the previously mentioned T flip-flops 155 and 156 with the trigger conductor 89 connected to the toggle terminal T of the flip-flop 155. The $\overline{Q}$ output of this flip-flop is connected to the toggle terminal of the next flip-flop 156. The Q output of flip-flop 156 is connected to an input of a NOR gate 162 and the $\overline{Q}$ output of flip-flop 156 is connected to an input of another NOR gate 164. The Q output of flip-flop 155 is connected by a conductor 95 which is connected to the remaining inputs of NOR gates 162 and 164, is connected to the gate of transistor 147 and connected to one of the four inputs of the NOR gate 172.

The output of NOR gate 162 is connected to the gate of an enhancement mode FET transistor 163 with the source connected to internal ground and the drain connected to the output terminal UP and also connected through a resistor 97 to the voltage terminal −V. NOR gate 164 is connected to the gate of enhancement mode FET transistor 165, the source of which is connected to ground. The drain thereof is connected to the output terminal DN and is also connected through a resistor 98 to the operating voltage terminal −V.

The output circuit 83 is also provided with a regulator transistor 166 with the gate thereof connected to conductor 95, the source connected to internal ground and the drain connected to a regulator terminal R2 and also connected through a resistor 99 to the −V terminal.

There is also a lamp option input terminal OPT which is connected to a complex gate consisting of four transistors. These transistors include enhancement-mode FET transistors 157–159 and a depletion-mode FET transistor 160. It is the gate of transistor 158 which is connected to the option terminal OPT and through a depletion-mode FET transistor 161 to ground. Transistors 157 and 158 are connected in parallel to ground. Transistors 160 and 159 are connected in series with this parallel combination to the operating voltage −V. The gate of transistor 157 is connected to the Q output of flip-flop 156 and the gate of transistor 159 is connected to the Q output of flip-flop 155.

A lamp output may be considered as a part of the output circuit 83. This lamp output includes the lamp delay circuit 82 which has a two input NOR gate 124 supplying an inverter 125 in turn supplying the gate of an enhancement-mode FET transistor 126. This transistor is connected through a pull-up resistor 96 to the operating voltage −V and the source is connected to the internal ground. The junction between the resistor 96 and the transistor is connected to the lamp output terminal LP.

A lamp delay disable terminal DIS may be connected to the operating voltage −V, and is connected through an inverter 117 to the set input of the D flip-flop 116. This flip-flop has the D or data input connected to the operating voltage −V. The delay disable input terminal DIS is also connected through a depletion-mode FET transistor 118 to the internal ground. The output of NOR gate 124 is connected to a regulator transistor shown as an enhancement mode FET transistor 127. The drain of this transistor is connected to a regulator terminal R1 and is also connected through a pull-up resistor to the operating voltage −V. The source of this transistor is connected to the internal ground.

Figure 3:
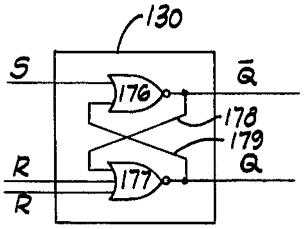
FIG. 3 is a schematic diagram of a latch circuit.

FIG. 3 illustrates the internal circuit of the RS flip-flop 130. It includes NOR gates 176 and 177 with a set input S to one input of gate 176 and this gate supplying the $\overline{Q}$ output, which in FIG. 4 is not used. The output of gate 176 is connected by a conductor 178 to an input of the NOR gate 177 and the output of this gate 177 is connected by a conductor 179 to an input of the gate 176 for a latch configuration. The output of gate 177 supplies the Q output of the flip-flop 130. Two reset input terminals R are connected to inputs to the NOR gate 177. In the circuit of FIG. 4 only one reset input is used in which case the other reset input terminal is connected to the internal ground 86. In FIG. 4 the flip-flops 143 and 153 are ones which use two separate reset terminals, and these would be flip-flops as illustrated in FIG. 3.

OPERATION

The sequencer 64 shown in FIG. 4 is a digital control circuit which may be an integrated circuit mounted on single chip of silicon. Since this chip may be quite tiny, for example 0.01 square inches, the power dissipating capabilities of such chip are small and typically may be 10 milliamperes at 15 volts. The circuit shown in FIG. 4 in this preferred embodiment is using PMOS technology and primarily using FET transistors. Negative logic is used to describe this PMOS technology because the operating voltage is a negative voltage, e.g. 15 volts relative to internal ground 86 which is zero volts. This means that the logic conditions of zero and one correspond to ground and −V, respectively.

Two different types of FET transistors are used with transistor 75, for example, being an enhancement-mode transistor and illustrated with a single bar connecting drain and source. Transistor 128, for example, is a depletion-mode FET transistor and illustrated in the drawing with a double bar connecting the drain and source. The enhancement-mode transistor such as transistor 75 has zero drain current for a zero source to gate voltage. The depletion-mode FET transistor on the other hand does have a definite conduction even at zero source to gate voltage and hence acts like a resistor permitting current flow therethrough.

The D or data flip-flops in the circuit of FIG. 4 such as flip-flops 131 and 132 are flip-flops with a toggle T and with data input D, and when the flip-flop gets a toggle input, the Q output goes to whatever the D input is at that time. The toggle flip-flops such as flip-flops 103–115 are ordinary flip-flops wherein the Q output changes each time there is a toggle input.

The RS flip-flops, such as 130 and 143, are reset to Q = 0 by a logic one on the reset terminal R. If the logic one remains on R, then when a logic one is applied to the set terminal S, $\overline{Q}$ changes from one to zero but Q cannot change to one. If the one R is removed, then when a logic one on is applied to S, this sets the flip-flop, and Q changes to a one.

Referring to FIG. 1, when the push button 44 is depressed or the radio receiver switch 48 is closed, this provides an input signal from these manual switch means to change the condition of the door operator motor 21. Assuming first that the door 23 is closed and the motor 21 is deenergized, then the sequence of operation is door opening, door open, door closing, and door closed. For the upward opening garage door this may be considered as run up, stop up, run down, and stop down. A truth table for the Q outputs of flip-flops 155 and 156 in FIG. 4 and the above four conditions is as follows:

| 155 | 156 | Condition |
|---|---|---|
| 0 | 0 | run up |
| 1 | 0 | stop up |
| 0 | 1 | run down |
| 1 | 1 | stop down |

With A.C. source 29 supplying power, the sequencing control circuit 20 of FIG. 1 and FIG. 2 will control energization of the motor 21 and of the lamp 24. This A.C. source will supply power at a low voltage, e.g. 24 volts to terminals 2 and 3 of the sequencing control circuit 20. This in turn supplies lightly filtered D.C. power to energize the relays 60–62 and power to the radio receiver 47. Filtered D.C. power is also supplied at the $V_{ss}$ terminal of the sequencer 64. As shown at the right side of FIG. 4 this $V_{ss}$ terminal is the internal ground 86 so that the circuit of FIG. 4 is positive ground and the circuit of FIG. 2 is negative ground by the external ground 54.

Considering first the output circuit 83 of FIG. 4, the above truth table shows that in the stop down condition the Q outputs of both flip-flops 155 and 156 are in a logic one condition. Flip-flop 155 may be considered the run or stop flip-flop and flip-flop 156 may be considered the up or down flip-flop. In this preferred embodiment the motor 21 may be made to run in the run up condition by a trigger signal on the trigger conductor 89 which toggles flip-flop 155. This changes the $\overline{Q}$ output to a one which toggles the flip-flop 156 changing the Q output from a one to a zero. In the NOR gates shown in FIG. 4, conventional logic is used, that is, any logic one on an input creates a zero at the output thereof, and all zeroes on the input create a one on the output. This logic zero on the Q of 156 causes NOR gate 162 to change state to a logic one output. This turns on transistor 163. Previously, when the motor was deenergized, the output terminal UP was at a logic one condition because it was tied through pull-up resistor 97 to the operating voltage −V. Now that the transistor 163 is turned on, this UP terminal goes to a logic zero. Referring now to FIG. 2 this logic zero condition is internal ground which externally is the positive Dc voltage of the power supply 58. This positive voltage on the base of transistor 70 turns on this transistor 70 which in turn energizes relay 60 and closes contact 66. This makes a connection between terminals 11 and 16 and hence the motor rotor 30 runs in the up direction to open the door 23.

Similarly, for a run down condition of the door 23, the $\overline{Q}$ output of flip-flop 156 goes to a zero and Q of flip-flop 155 goes to zero. Thus NOR gate 164 output changes state to a logic one, transistor 165 turns on and the terminal DN goes to a logic zero turning on transistor 71 and relay 61 of FIG. 2 which closes the circuit between terminals 12 and 16. Accordingly what is wanted is a trigger signal on the trigger conductor 89 in order to get the flip-flops 155 and 156 to be toggled.

The manual switches 44 and 45 normally control the inputs to start the motor 21 and the load switches 27, 28 and 29 normally stop the motor, however, these functions may be reversed, for example, the manual switches 44 or 45 may also be used to stop the motor.

The sequencing control circuit 20 provides these functions in proper sequence and also controls the lamp 24 plus providing a lamp delay function. In addition, the sequencing control circuit 20 ignores obvious, unintentional or false commands such as shorted push button wiring or push buttons 44 or 45 held on for too long a time period, and permits normal functions of the limit and torque switches 27–29. The sequencing control circuit 20 does not respond to false noise commands that might be electrically or mechanically generated such as induced 60 Hertz voltage or contact bounce.

In FIG. 4 the clock frequency is shown as being obtained from the 60 Hertz power line. The Schmitt trigger 101 eliminates power line jitter so that induced voltage or other false noise commands do not affect the sequencer 64. The transistor 102 is a transistor which limits the input voltage to a few volts in excess of the operating voltage −V, which for example might be −15 volts. This assures that the integrated circuit voltage maximums are not exceeded.

The clock frequency from the clock circuit 75 is passed to the divider or timing counter circuit 76. This generates from the clock frequency all of the various time delay periods desired within the sequencer 64.

One-thirtieth of a second timing periods are generated from the Q output of flip-flop 103 and these are passed by the inverters 121 and 120 to NOR gate 119 which supplies the set pulses to the flip-flops 130, 143 and 153. These 1/30 of a second timing periods are used for noise rejection at the push button terminal PB, or the torque input TQ, and the limit input LIM. The Q output of flip-flop 104 provides 1/15 second period pulses to power-up reset flip-flops 170 and 171. The toggle-counter string of flip-flops 105–112 provides successively longer timing pulses. The flip-flop 108 has a timing period of about one second and since the pulse is one-half of the period this provides a one-half second timing pulse to NOR gate 122. The counters 109–111 are included in this timing so that only one pulse occurs in an eight and one-half second period. A timing pulse of about one second is provided from the counter 109 through inverter 123. Also from the Q output of flip-flop 112 a timing pulse of about 8.5 seconds is supplied to the NOR gate 135. The flip-flop 116 provides a timing pulse at the $\overline{Q}$ output of approximately 136 seconds. This is used for lamp deenergization delay.

The power-up circuit 79 is used to make certain that the sequencing control circuit 20 is always powered or energized in the stop down condtion of the motor 21. This is distinguished from the prior art electromagnetic relays. In such prior art systems, if the power were somehow interrupted during the run up condition of the motor and then power restored, the normally closed torque switch, similar to switch 29, would provide another impulse to the actuating coil of the electromagnetic stepping relay which would index the relay into the stop up condition, even though the door was partly up. The limit switch 27 is shown closed in FIG. 1, and it may or may not be closed, but if closed, it could create the same condition as the normally closed torque switch 29. Next if the push button 44 were depressed to start the motor, the motor would start in the run down mode, which could be a dangerous condition. The present sequencing control circuit 20 eliminates this hazard. As the A.C. source 39 is first applied to the step down transformer 42, the rectifier 59 would begin to conduct current and the capacitors in the D.C. filter would begin to charge. This means that the power supply of voltage −V is increasing as a ramp-like voltage. In FIG. 4 the power-up circuit 79 shows that this voltage −V is applied to transistor 167. Initially the output of inverter 169 is a logic one which resets the D flip-flops 170 and 171. The input to inverter 169 is a logic zero because the depletion mode transistor 168 conducts the ground and the enhancement mode transistor 167 is not conducting until the voltage −V increases to be more negative than the threshold voltage of transistor 167. The input to inverter 169 effectively remains a logic zero until this negatively increasing operating voltage −V increases to be more negative than the sum of the thresholds of transistor 167 and 169. During this time the flip-flops 170 and 171 are reset by a logic one on the reset inputs thereof so that the Q outputs of the flip-flops is a logic zero and thus $\overline{Q}$ of flip 171 is a logic one which is used as a power-up reset. This logic one goes to the two flip-flops 155 and 156 in the output circuit 83 thus setting them so that both Q outputs are ones. According to the truth table set forth above this is a stop down condition of the motor 21.

As the operating voltage −V further increases in negative magnitude, it becomes negative enough to overcome the thresholds of transistor 167 and inverter 169 and the input to inverter 169 effectively becomes a logic one, thus its output becomes a logic zero and no longer resets the flip-flops 170 and 171. However, they have previously been reset. The $\overline{Q}$ of flip-flop 171 remains a logic one which in addition to setting the flip-flops 155 and 156 also resets the flip-flop 173.

The D or data input of flip-flop 170 is connected directly to a logic one which is the −V voltage. The first negative transition of the 1/15 of a second pulse from the Q output of flip-flop 104 toggles flip-flop 170 to a one state at the Q output. This next negative transition of the 1/15 of a second line toggles the logic one now at the D input of flip-flop 171 to its Q output. The $\overline{Q}$ output which is the power-up reset is now a logic zero and remains a zero until the next time power is first applied. It will be noted that all flip-flops with toggle inputs or D inputs are clocked upon the negative going logic one transition of the toggle input.

The GO circuit 77 provides input noise rejection and debounce of input contacts. The PB, TQ and LIM inputs contain three identical noise rejection circuits but there is only one debounce circuit shared by all three inputs. The inverter 129, and flip-flops 130 and 131 are the noise rejection devices for the PB input. It will be noted that the radio receiver 47 is also connected to the push button PB input. In a similar manner inverter 142 and flip-flops 143 and 144 act for the TQ input and inverter 152 and flip-flops 153 and 154 act for the LIM input. Only the noise rejection of the PB input will be described.

Figure 5:
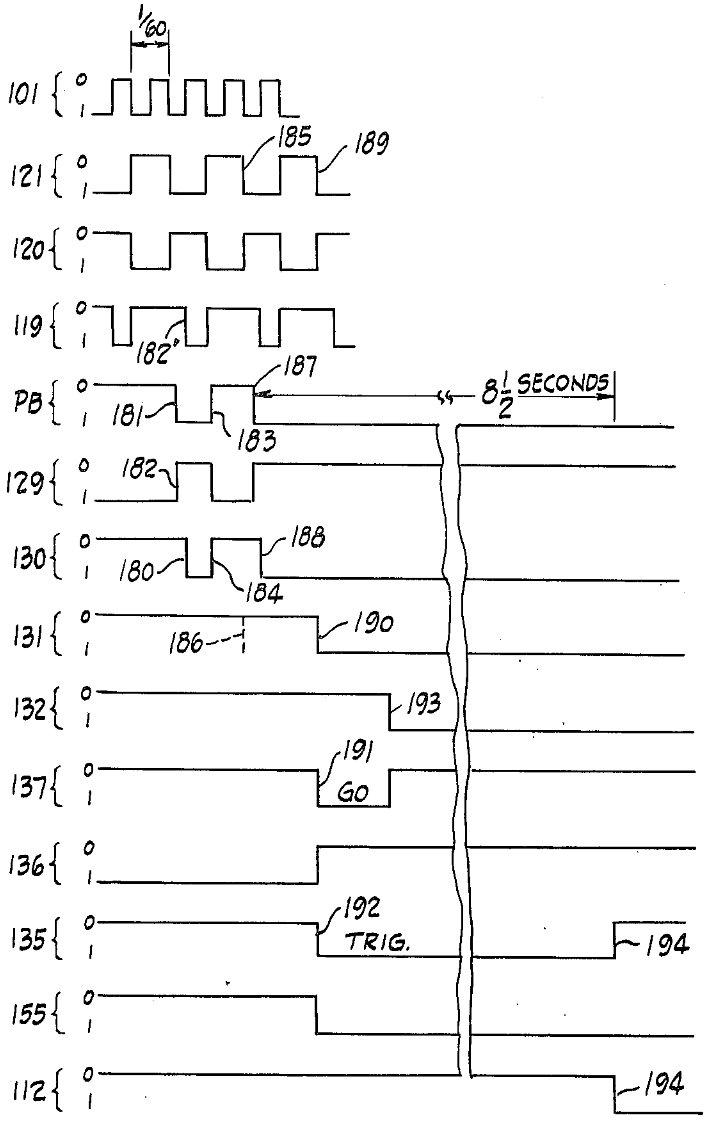
FIG. 5 is a graph of logic voltages appearing at various points in the circuit of FIG. 4.

The output of inverter 121 clocks data from flip-flop 130 into flip-flop 131. Also inverter 121 feeds inverter 120 which controls the NOR gate 119. The output of NOR gate 119 on conductor 87 makes the transition to logic one synchronized with inverter 121 but it is delayed by 1/120 of a second by the output of the Schmitt trigger 101. FIG. 5 shows a graph of the pulses making up the zero and logic one, with the logic one condition shown as negative of the zero because of the negative logic used in FIG. 4. The 1/60 of a second timing periods are shown from the output of the Schmitt trigger 101 and of course this means that the pulses are one-half of this or 1/120 of a second. FIG. 5 shows that the negative going transition of 119 is 1/120 of a second later than the negative going transition of the inverter 121. Thus the flip-flop 130 is set, as at point 180 on FIG. 5, during the last half of the logic one duration of inverter 121. NOR gate 119 is logic zero during the first half of the logic one of inverter 121 and during the logic zero of inverter 121.

A command at the push button input PB is in the form of a switch closure to external ground which is a switch closure to −V or a logic one. During switch open condition the depletion mode transistor 128 acts like a resistor and pulls the PB input, the input of inverter 129, to a logic zero thus the output of 129 is a logic one which resets the flip-flop 130. As long as there is a time when the push button input is a logic zero during the 1/60 of a second that inverter 121 is a logic zero, flip-flop 130 will be reset and inverter 121 will clock a logic zero into flip-flop 131. Thus no command will be recognized. A 60 Hertz or higher frequency noise signal can be imposed upon any of the PB, TQ or LIM inputs with no response, as established by the debounce circuit.

This is illustrated in FIG. 5 with a 60 Hertz noise pulse 181 appearing on the PB input. This causes the output of inverter 129 to go to a logic zero at the pulse 182. When the output of NOR gate 119 next goes negative at the negative transition 182', this sets the flip-flop 130 to a logic one at the negative transition 180 because the reset R of this flip-flop 130 has now been released. However, when the noise pulse disappears at time 183 the output of inverter 129 goes back to a logic one which resets the flip-flop 130 at time 184, so that the Q output is now a logic zero. Accordingly, when inverter 121 has the next negative going transition at time 185 and toggles flip-flop 131 the data input D to this flip-flop 131 is a logic zero so that there is no logic one condition toggled into flip-flop 131 as shown at the dotted line 186. Thus the Q of flip-flop 131 stays at logic zero. However, when a genuine input signal appears from the push button input PB as at time 187, the reset on flip-flop 130 is released, and the next time that the output of NOR gate 119 goes to a logic one this is set into the flip-flop 130 at time 188. 3/120 of a second later when the inverter 121 has the next negative transition at time 189 this logic one condition on the D input of 131 is toggled into flip-flop 131 as at time 190. The $\overline{Q}$ of flip-flop 131 will then be a zero. The Q of flip-flop 132 will have been a zero since flip-flop 132 is clocked by inverter 121 and therefore still contains a previous zero from flip-flop 131. Thus the NOR gate 137 is enabled by three zeroes on the inputs and the output of gate 137 will go to a logic one. This is a GO pulse on the conductor 88 and it resets the counters or flip-flops 105–112 and changes the NOR gate 136 to a logic zero which changes the NOR gate 135 output to a logic one. This is the trigger signal shown at 192 on FIG. 5 and is the trigger signal as mentioned above to change the state of the output circuit 83. This trigger pulse clocks the flip-flop 155 from a run to stop mode or from a stop to a run mode. If flip-flop 155 was clocked to a run mode, the output thereof clocks flip-flop 156 from an up to a down mode or from a down to an up mode. Meanwhile, 1/30 of a second after the GO signal became a logic one at time 191, the logic one in flip-flop 131 is clocked by inverter 121 into flip-flop 132, thus the NOR gate 137 changes state at time 193 and the GO signal is now a logic zero.

The inverter 139 and the NOR gate 138 prevent another GO equal logic one signal from happening until the trigger signal on conductor 89 is again a logic zero. Thus even if the PB input was then made a logic zero, from an open switch, and therefore flip-flops 130, 131 and 132 would again be zero, and then the switch was again closed, resulting in NOR gate 137 having two input logic zeroes, the output of NOR gate 138 would still be a logic one and would inhibit the GO signal.

The Q of flip-flop 132 goes to a logic zero when the PB is zero and tries to enable NOR gate 133 which would turn off NOR gate 135 and thus the trigger signal would be logic zero. The NOR gate 122 prevents gate 133 from going to a logic one for one-half second after the GO signal so that any command is not recognized more often than two times per second, thus the maximum sequence rate is two times per second.

The signals from TQ and LIM produce a GO by setting flip-flop 131 and resetting flip-flop 132 via the complex gate composed of driver or enhancement mode transistors 145 through 149 and the depletion mode load transistor 150. The TQ or LIM inputs can produce a GO signal only during the run mode since the Q output of flip-flop 155 feeds a logic one to the gate of transistor 147 to turn it on during a stop mode and neither a logic zero at transistor 149, which occurs when the TQ signal is a logic one, nor a logic zero at transistor 148, which occurs when the LIM input is a logic one, can produce a GO signal. Also the trigger signal at conductor 89 feeds transistor 145 via inverter 140 so that inputs at TQ or LIM cannot produce a GO for a minimum of the first one-half second of any run mode.

Safety reversal of the door 23 upon an overload condition during a run down mode is provided so that should a child or a pet animal become caught underneath the door, the door will not only stop but will reverse and return upwardly. This safety reversal is provided by the reversal circuit 80 which includes the four input NOR gate 172. The gate 172 is normally a logic zero output to not set flip-flop 173. The gate 172 has a logic one output if all four inputs are zero and this logic one output will set the flip-flop 173 if all of the following are true:

1. LIM input is a logic zero.
2. Flip-flop 156 is a logic one, signifying the down mode.
3. Flip-flop 155 is a logic zero, signifying a run mode.
4. TQ input is a logic one.

It will be noted that the LIM and TQ inputs are inhibited by the trigger signal on conductor 89 via inverters 139 and 140 which resets flip-flops 143, 144, 153 and 154, therefore preventing any LIM or TQ response during the first one-half second of run.

Now if a child should get caught underneath the door while it is descending, this will overload the clutch 31 causing it to slip and causing the torque switch 29 to close. This provides an input at TQ during run down and will produce a stop down mode for one-half second and then a run up mode for at least one-half second or until another command is recognized. The stop down mode was produced by the TQ input going to logic one, which set flip-flop 173, turning off transistor 146, thus making conductor 92 a logic one and this set flip-flop 131 and reset flip-flop 132 for a GO signal. The run up mode was produced because the flip-flop 173 was formerly a logic one and turned off transistor 146 producing a GO signal when the trigger signal on conductor 89 went to a logic zero and turned off transistor 145. The flip-flop 173 is reset by flip-flop 156 when in the logic zero or up mode.

The enable circuit 81 enables connecting a time delay to the motor energization control so that the time delay means enables control of the motor by a signal from the load switches which are the limit switches or torque switch. Also this enable circuit 81 disables control of the motor by a constant signal from any of the input switches which exceeds a first time delay period. In the preferred embodiment this first time delay period is set at about eight and one-half seconds in the run up mode as determined by the Q output of flip-flop 112, and is set at about one second in the run down mode as determined by the Q output of flip-flop 109.

If the PB input is a logic one continuously, such as might happen if a wire is short circuited to ground or a stuck transmitter, or a rake accidentally leaning against the push button 44, then the flip-flops 131 and 132 will remain at a Q output of logic one and will not be able to turn off the gate 135 nor the trigger signal at conductor 89. The Q output of flip-flop 112 feeds the NOR gate 135 so that after eight and one-half seconds the trigger signal will become a logic zero no matter what else happens and then the TQ or LIM input signals can be recognized by the sequencer 64. This occurs as shown on FIG. 5 at time 194. The inverter 123 and NOR gate 134 provide the same function after only one second if the sequencer is in the down mode. This one second override of the PB input signal in the down mode allows reversal upon TQ equaling a logic one after only about seven inches of door movement for a typical garage door operator. A continuous PB input signal equaling a logic one will not produce two trigger signals on conductor 89 even if the power is turned off and then turned back on. By this enable circuit, the door cannot run past the limit switches with the switches having no affect on the circuit. This would be a dangerous condition and was possible with the prior art arrangements.

The lamp 24 may be controlled in a variety of manners including time delay of the deenergization or no delay. The normal lamp output to the output terminal LP is through a gate and transistor configuration similar to the up or down signal to operate the motor. Normally the lamp is turned off by logic zero condition on conductor 93. The depletion-mode transistor 160 acts as load or pull up resistor to attempt to keep conductor 93 at the −V voltage or logic one. However from the above truth table in the stop down condition the two Q outputs of flip-flops 155 and 156 are at logic one. This is the condition when the system is at rest for a long time with the door closed. This turns on transistors 157 and 159 pulling conductor 93 to a logic zero. Thus the NOR gate 124 has two zero inputs for a logic one output and a logic zero output of inverter 125. This turns off transistor 126. If this transistor is off the lamp 24 is off, because then the lamp output terminal LP is at negative voltage −V and this is applied, on FIG. 2, to the base of transistor 72. This −V voltage is the same as external ground which is the same as the emitter voltage hence transistor 72 is turned off and so relay 62 is not energized and the lamp 24 is not energized.

Now if the conductor 93 goes to a logic one condition this will turn on the lamp 24. Conductor 93 goes to a logic one, according to transistors 157, 158 and 159 if:

1. Output circuit 83 is in the run mode, which makes flip-flop 155 Q output go to zero turning off transistor 159, or
2. Output circuit 83 is in the stop mode and the lamp option input terminal OPT is not connected to −V.

If the circuit is in the stop-up mode, then the lamp is on because Q of flip-flop 155 is a one but the Q of flip-flop 156 is a zero which turns off transistor 157 making conductor 93 a logic one. This one on the input of NOR gate 124 makes its output a logic zero, the output of inverter 125 is a logic one and this turns transistor 126. As seen above this turns on the lamp 24. The lamp is also on for the stop down mode but in this mode the time delay of about one hundred thirty six seconds is in operation. For the stop down mode the above truth table show that the Q of flip-flops 155 and 156 are a one which turn on both transistors 157 and 159. This makes conductor 93 a zero and thus the reset on the flip-flops 113 to 116 is released. This permits these flip-flops to start to count the period of about one hundred thirty six seconds. At the end of this time period the flip-flop 115 toggles flip-flop 116 and this clocks the data input into the Q output which is a −V voltage. Thus the $\overline{Q}$ output goes to a logic zero and with two zeroes on the input of NOR gate 124 the output goes to a one, the output of inverter 125 goes to a zero and this turns off the transistor 126 to turn off the lamp 24. This above description assumes that the lamp option input OPT is not connected to −V. The −V is the same as external ground, and FIGS. 1 and 2 show this OPT terminal externally grounded, but this is optional.

If it is connected to −V, this turns on transistor 158 so that transistor 157 is ineffective and 157 is controlled by the down mode condition from flip-flop 156. Also the lamp delay disable terminal DIS must be connected to the −V in order to have the lamp deenergization delay. This −V at terminal DIS passes through the inverter 117 to be a logic zero on the set terminal S of flip-flop 116 and thus has no affect. If the terminal DIS is not connected to −V then the input to inverter 117 is connected to internal ground through transistor 118 so that the output of inverter 117 is a logic one and this hard sets the flip-flop 116 so that the delay is always zero.

The regulator transistor 127 operates from the output of gate 124 so that this transistor is turned on whenever transistor 126 is turned off and this eliminates the need for external voltage regulation because the silicon chip on which the sequencer 64 is mounted will then have substantially constant current regardless of whether the lamp is on or off.

The regulator transistor 166 operates in a manner similar to regulator transistor 127, and is turned on whenever the transistors 163 and 165 are off. This maintains substantially constant current on the chip to eliminate need for external voltage regulation.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A sequencing control circuit for a single phase door operator motor operable to open and close a garage door as controlled by signals from manual switch means and load switch means, said sequencing control circuit comprising, in combination, output load sensing means connected to actuate the load switch means, input means connecting said switch means to control energization of the single phase motor, time delay means having a first time delay period, and enabling means connecting said time delay means to said motor energization control means so that said time delay means enables control of the motor by a signal from said load switch means.

2. A sequencing control circuit as claimed in claim 1, including means in said enabling means to disable control of the motor by a constant signal from said input means which exceeds said first time delay period.

3. A sequencing control circuit as claimed in claim 1, wherein said time delay period is in the order of six to eight seconds.

4. A sequencing control circuit as claimed in claim 1, wherein said time delay period is in the order of one second.

5. A sequencing control circuit as claimed in claim 1, wherein said enabling means is connected to prevent a short circuit on said input means from disabling control of the motor for a time period in excess of said first time delay period.

6. A sequencing control circuit as claimed in claim 1, wherein said enabling means enables control of the motor by a signal from said switch means which exceeds one and one-half cycles of an incoming alternating voltage powering said control circuit.

7. A sequencing control circuit for a single phase door operator motor operable to open and close a door as controlled by signals from control switch means, said motor and door as a load thereto having inertia and requiring energization of the motor for a predetermined short time period to have the motor accelerate from rest to a normal running speed condition, said sequencing control circuit comprising in combination, means to energize the single phase door operator motor, and latch means connected to said energization means to maintain said motor energization means energized upon a momentary input control signal thereto which has a duration less than said predetermined short time period.

8. A sequencing control circuit as claimed in claim 7, wherein said latch means includes, a latch circuit having an output connected to said motor energization means and having first and second inputs, means connecting said first input of said latch circuit to receive a control signal from the control switch means, and means connecting an output from said latch circuit in a feedback loop to said second input of said latch circuit to maintain said latch circuit latched.

9. A sequencing control circuit as claimed in claim 8, including a torque switch as part of the control switch means, said torque switch connected to be actuated by acceleration of the motor, and said latch means connected to maintain said motor energization means energized despite actuation of said torque switch during acceleration of the motor.

10. A sequencing control circuit as claimed in claim 8 including first and second gates in said latch circuit and said feed back loop interconnecting the output of one of said gates with the input of another of said gates.

11. A sequencing control circuit for a door operator motor operable to open and close a garage door as controlled by signals from control switch means, said sequencing control circuit comprising, in combination terminal means connectable to an AC source for energizing both said sequencing control circuit and the door operator motor, said sequencing control circuit establishing four sequential conditions of door opening, door open door closing and door closed conditions, and power-up reset means connected in said sequencing control circuit to reset the circuit to the door closed condition upon interruption and re-establishment of electrical power to said terminal means

12. A sequencing control circuit as claimed in claim 11, including first and second flip flops in said power-up reset circuit connected to establish a reset of said sequencing control circuit to said door closed condition

13. A sequencing control circuit as claimed in claim 12, including third and fourth flip flops in said sequencing control circuit, setting means for said third and fourth flip flops, and means connecting said power-up reset circuit to said setting means.

* * * * *